United States Patent
Singhai et al.

(10) Patent No.: US 7,003,294 B2
(45) Date of Patent: Feb. 21, 2006

(54) EFFICIENT RE-REGISTRATION OF MOBILE IP NODES

(75) Inventors: Sandeep Singhai, San Diego, CA (US); Marcello Lioy, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 553 days.

(21) Appl. No.: 10/032,267

(22) Filed: Dec. 20, 2001

(65) Prior Publication Data
US 2003/0119506 A1 Jun. 26, 2003

(51) Int. Cl.
*H04Q 7/20* (2006.01)

(52) U.S. Cl. ............... 455/435.1; 455/432.1; 370/329; 370/331; 370/395.52; 370/913

(58) Field of Classification Search ............ 455/403, 455/432.1, 410, 435.1, 556.2; 370/329, 331, 370/338, 349, 352, 356, 389, 395.52, 400, 370/401, 437, 912, 913; 709/228, 238, 245
See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,862,482 A | | 1/1999 | Beesley |
| 6,195,705 B1 | * | 2/2001 | Leung ................. 709/245 |
| 6,230,012 B1 | * | 5/2001 | Willkie et al. .......... 455/435.1 |
| 6,363,430 B1 | * | 3/2002 | Thomas ................ 709/245 |
| 6,374,108 B1 | * | 4/2002 | Jakobsen et al. ........ 455/432.1 |
| 6,567,644 B1 | | 5/2003 | Yasui et al. |
| 6,567,664 B1 | * | 5/2003 | Bergenwall et al. ....... 455/403 |
| 6,578,085 B1 | * | 6/2003 | Khalil et al. ............ 709/241 |
| 2002/0147837 A1 | * | 10/2002 | Heller .................. 709/238 |
| 2003/0031151 A1 | * | 2/2003 | Sharma et al. ........... 370/338 |

FOREIGN PATENT DOCUMENTS

| | | |
|---|---|---|
| WO | 9931853 | 6/1999 |
| WO | 0079760 | 12/2000 |

OTHER PUBLICATIONS

Perkins C: "Request for Comments: 2002, IP Mobility Support" XP0022222715 (1996).
Perkins C, et al., "Mobility Support In IPV6" Mobicom. Proceedings of the Annual International Conference on Mobile Computing and Networking, p. 1–11 XP002901803 (1996).

* cited by examiner

*Primary Examiner*—William Trost
*Assistant Examiner*—James D Ewart
(74) *Attorney, Agent, or Firm*—Philip Wadsworth; Sandra L. Godsey; Kyong H. Macek

(57) ABSTRACT

Methods and apparatus are presented to reduce the number of registration requests transmitted by a mobile node to a foreign agent. Rather than always sending the re-registration request at pre-determined times before the expiry of registration lifetime, re-registration requests are transmitted only if some data transfer takes place after a time period demarcated by the previous successful registration.

5 Claims, 3 Drawing Sheets

EFFICIENT RE-REGISTRATION OF MOBILE IP NODES

BACKGROUND

FIELD

The present invention relates generally to communications, and more specifically, to the transmission of packetized data over wireless communication systems.

BACKGROUND

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

Given the growing demand for wireless data applications, the need for very efficient wireless data communication systems has become increasingly significant. One such wireless data application is the transmission of data packets that originate or terminate at packet-switching networks. Various protocols exist for transmitting packetized traffic over packet-switching networks so that information arrives at its intended destination. One such protocol is "The Internet Protocol,"Request for Comments (RFC) 791 (September, 1981). The internet protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. The transmission control protocol (TCP), promulgated in RFC 793 (September, 1981), is responsible for the reliable, in-order delivery of data from one application to another. The User Datagram Protocol (UDP) is a simpler protocol that is useful when the reliability mechanisms of TCP are not necessary. For voice traffic services over IP, the reliability mechanisms of TCP are not necessary because retransmission of voice packets is ineffective due to delay constraints. Hence, UDP is usually used to transmit voice traffic.

The transmission of data packets from the IP network over a wireless communication network or from the wireless communication network over the IP network can be accomplished by adherence to a set of protocols, referred to as a protocol stack. Typically, a wireless communication device communicates with a base station(BS) and/or packet data serving node (PDSN) through an interface Um. A wireless communication device may be the origination or the destination of the IP packet, or alternatively, the wireless communication device may be a transparent link to an electronic device. In either case, payload information is broken into packets wherein header information is added to each packet. The IP header sits on top of the PPP layer, which sits on the RLP layer, which sits on top of the physical layer. The RLP layer is the Radio Link Protocol layer, which is responsible for retransmitting packets when a transmission error occurs. The packets are transported over the air to a BS/PDSN, whereupon the packet is subsequently sent over the IP network.

An issue that arises due to the nature of mobile communications is addressing. As stated above, the IP protocol requires that each data packet contains unique identifiers for the host and destination computers. Since a mobile communication device is capable of travelling from the range of one base station to another, a data packet addressed to the mobile communication device must be able to reach said device. Hence, some mechanism is needed to enable the continuity of data transfer when the mobile communication device is actually travelling. RFC 2002 (October 1996) proposes a solution to this problem. The protocol promulgated in this document enables a mobile communication device to change the point of attachment to the Internet without having to change the IP address of the device. Namely, RFC 2002 describes a registration scheme that informs a home agent of the location of a mobile communication device so that the home agent can route data packets through foreign agents.

However, the solution proposed by RFC 2002 is not optimal in that the registration procedure requires the usage of channel resources between the mobile communication device and network infrastructure elements. "Channel resources" is a term used generically to describe the transmission channel and the resources required to prepare a packet for transmission. In a CDMA system, such resources can encompass spreading codes, modulation symbols, and other processing elements. In particular, the registration and re-registration events consume valuable channel resources in order to maintain the point of attachment with the home agent. There is a present need to implement a registration and re-registration procedure that minimizes the consumption of channel resources.

SUMMARY

Methods and apparatus are presented herein to address the above stated needs. Rather than sending the Mobile IP re-registration requests at pre-determined times before the expiry of registration lifetime, the re-registration requests are transmitted only if some data transfer takes places after the previous successful registration. In case there is no data transfer after a successful registration and before the registration lifetime expires, the Mobile IP session is terminated.

In one aspect, an apparatus for re-registering a mobile node with a foreign agent is presented, the apparatus comprising: a memory element; and a processor configured to execute a set of instructions stored within the memory element, the set of instructions for: performing a registration with the foreign agent wherein a lifetime is set; refraining from performing a re-registration if a pre-determined period, which is less than the registration lifetime, has expired and no packet has been transmitted or received; and performing a re-registration only if some packet is transmitted or received after a successful registration and before registration lifetime.

In another aspect, an apparatus for registering a mobile node operating in a visited network is presented, the apparatus comprising: registration means for performing an initial registration and subsequent re-registrations of the mobile node with a foreign agent in the visited network; and timing means for use with the registration means, wherein the registration means uses the timing means to determine whether to follow a standard protocol or to disregard the standard protocol, wherein disregarding the standard protocol is to refrain from performing the re-registration of the mobile node.

In another aspect, a method is presented for re-registering a mobile node with a foreign agent, the method comprising: performing an initial registration with a foreign agent in the visited network; if an IP packet is transmitted or received within a predetermined time period, then following a standard protocol; if an IP packet is neither transmitted nor received within the above mentioned predetermined time period, then refraining from performing a re-registration with the foreign agent, wherein refraining from performing the re-registration is contrary to the standard protocol; and if an IP packet is transmitted or received after the predetermined time period and before the registration lifetime, then transmitting or receiving the IP packet and transmitting a re-registration request.

DETAILED DESCRIPTION

Figure 1:
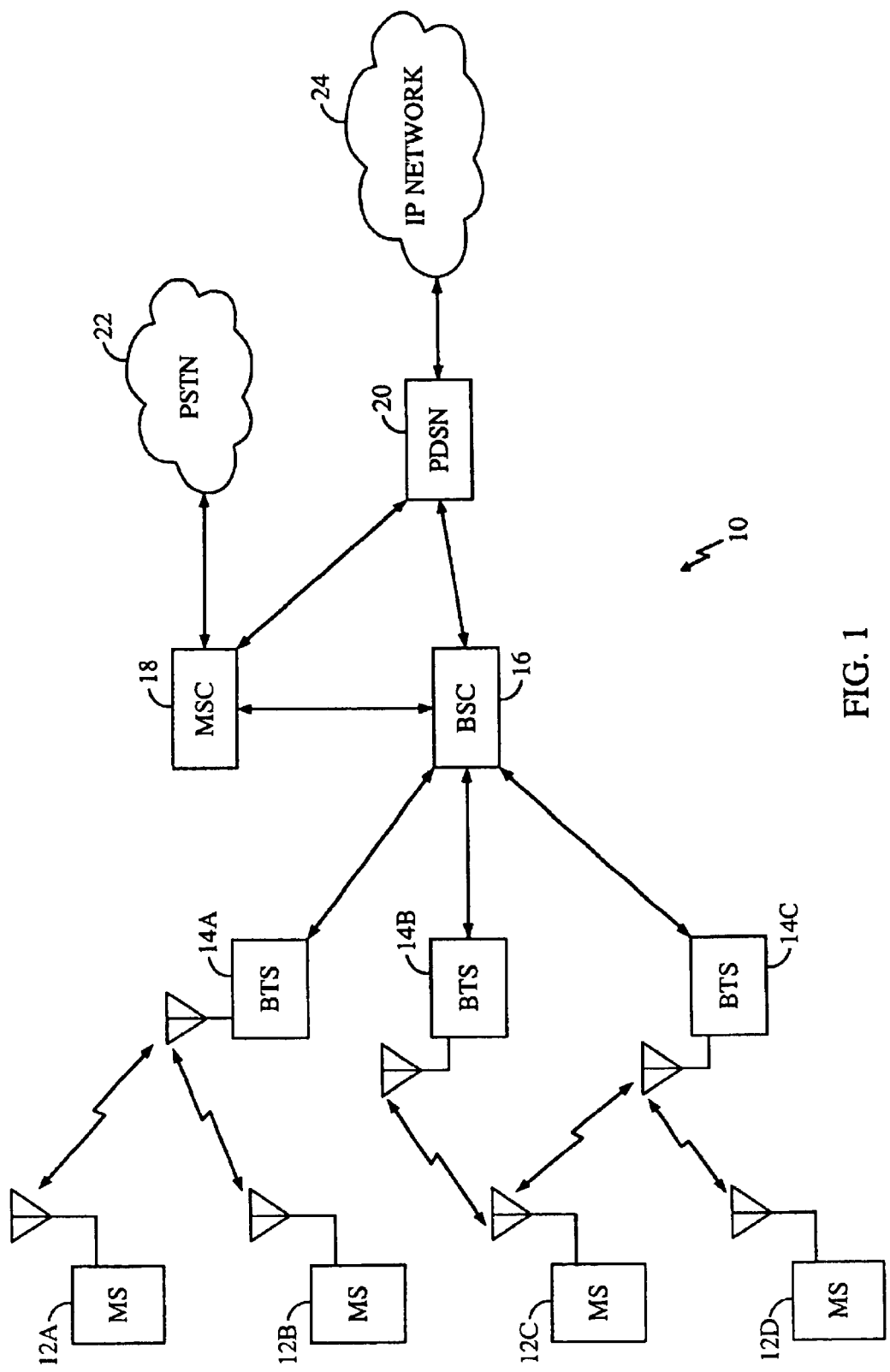
FIG. 1 is a diagram of a wireless communication network.

As illustrated in FIG. 1, a wireless communication network 10 generally includes a plurality of mobile stations (also called subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an IP network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base station 14a–14c is processed within that base station 14a–14c. Each base station 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

It should be noted that the "packets" of the CDMA system are structurally distinct from the "packets" of the packet-switching network. Both are units describing the format in which data is transmitted, but one is optimized for wireless networks and the other is optimized for a packet-switching network. For example, a data packet from an IP source would contain a header portion and a data portion. However, a data packet for transmission over the air carries data that has been encoded and modulated, and probably subjected to symbol repetition before being packed into a packet. Hence, a packet from a packet-switching network will have to reformatted for use on the wireless network.

For illustrative ease, the terminology of RFC 2002 will be used forthwith. A mobile communication device configured to process IP packets will be referred to as a mobile node. The router that processes IP packets at the home system of the mobile node for delivery to the mobile node will be referred to as a home agent. The router that services the mobile node at a visited system will be referred as a foreign agent. In reference to FIG. 1, the functions of a foreign agent and/or home agent can accomplished by a BSC 16 in a visited network or a BSC 16 in the home network.

According to RFC 2002, the IP packets are routed based on the destination address in the IP packet header. Each mobile node has a permanent IP address. However, the mobile node may be travelling from the services of one foreign agent to another foreign agent. Hence, the point of attachment to one network may change frequently. The current point of attachment is referred to as a "care-of" address. Registration of the mobile node is performed so that the mobile node can request forwarding services when visiting a foreign network, inform the home agent of the current care-of address, renew a registration that is due to expire and/or de-register when the mobile node returns home.

Hence, registration messages exchange information between a mobile node, a foreign agent, and the home agent. Registration allows the home agent to modify a mobility binding of the mobile node. A mobility binding is the association between the permanent IP address of the mobile node and the care-of address of the mobile node. A mobility binding is typically valid for a "lifetime" before being torn down. A registration process and a re-registration process is described in FIG. 2.

Figure 2:
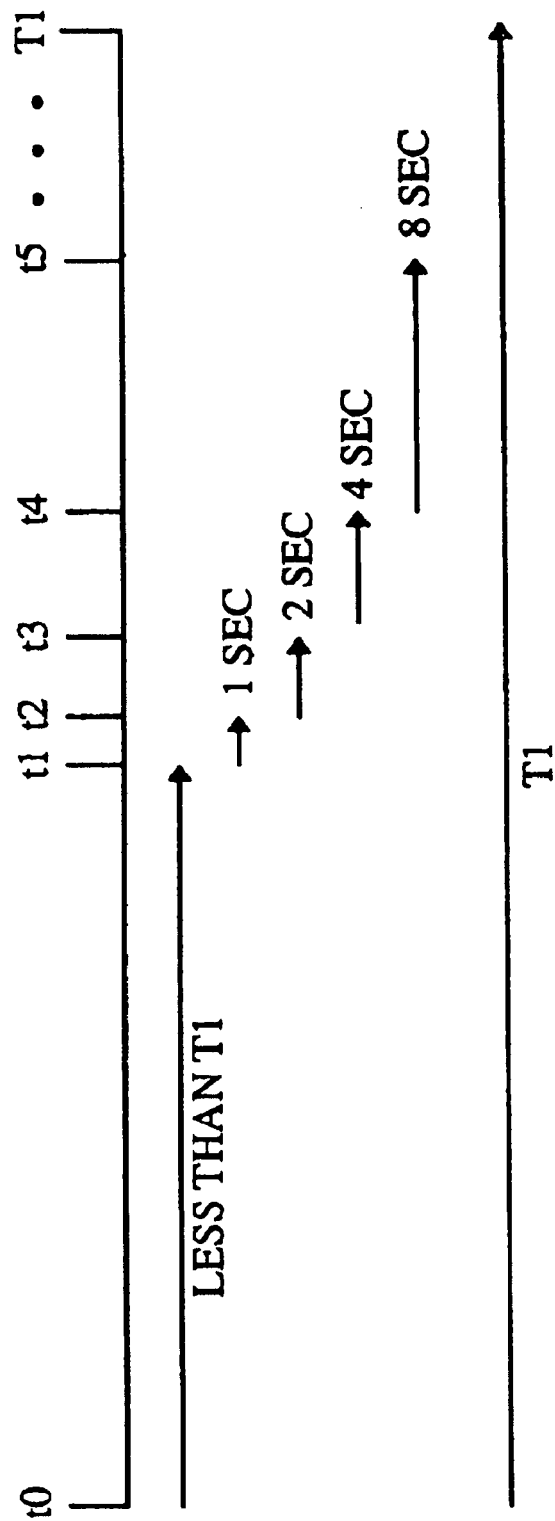
FIG. 2 is a timeline of the current re-registration timing requirements according to RFC 2002.

FIG. 2 is a timeline of the registration and re-registration process as currently presented in RFC 2002. At time $t_0$, a mobile node performs an initial registration process. The process entails a transmission of a registration request message to the prospective foreign agent, a transmission of the registration request message from the prospective foreign agent to the home agent, the transmission of a registration reply to from the home agent to the prospective foreign agent, and the transmission of the registration reply from the prospective foreign agent to the mobile node.

If the registration reply from the home agent grants service access, a lifetime is set that indicates the duration of the mobile IP binding. The duration of the lifetime used by the mobile is either that requested by the mobile node or that granted by the home agent, whichever duration is shorter. Once the lifetime has been determined, a timer is set for time $t_1$ whose expiry indicates when the mobile should attempt to re-register. A second timer is set for time $T_1$ whose expiry indicates that the Mobile IP session is over. In order to maintain the Mobile IP session, $t_1$ must be shorter than $T_1$.

When the timer expires at $t_1$, the mobile will attempt to re-register and the timer is reset for $t_2$. If a reply is not received by time $t_3$, another request is sent, and the timer is reset for $t_3$. This continues until the timer set for time $T_1$ expires. At this point, the session is terminated. The time between subsequent registrations is governed by a "geometric backoff," wherein a constant multiplier is applied to the value that was previously used for the timer. For example, if $t_2$ is set to 1 second and the multiplier is 2, then $t_2$ will be 2 seconds, $t_3$ will be 4 seconds, and so on.

Although the above re-registration process is favorable for determining the position of a mobile node in a wireless communication network, the above re-registration process is undesirable in that channel resources must be allocated for each registration request message and registration reply that are transmitted over the air. A single mobile node operating under the services of a foreign agent may not significantly impact system capacity, but numerous mobile nodes, such as found in a densely populated region operating under the services of the same foreign agent, could significantly impact the voice and data capabilities of the network.

The embodiments described herein are for minimizing the amount of system resources that are used for the registration and re-registration of mobile nodes.

Figure 3:
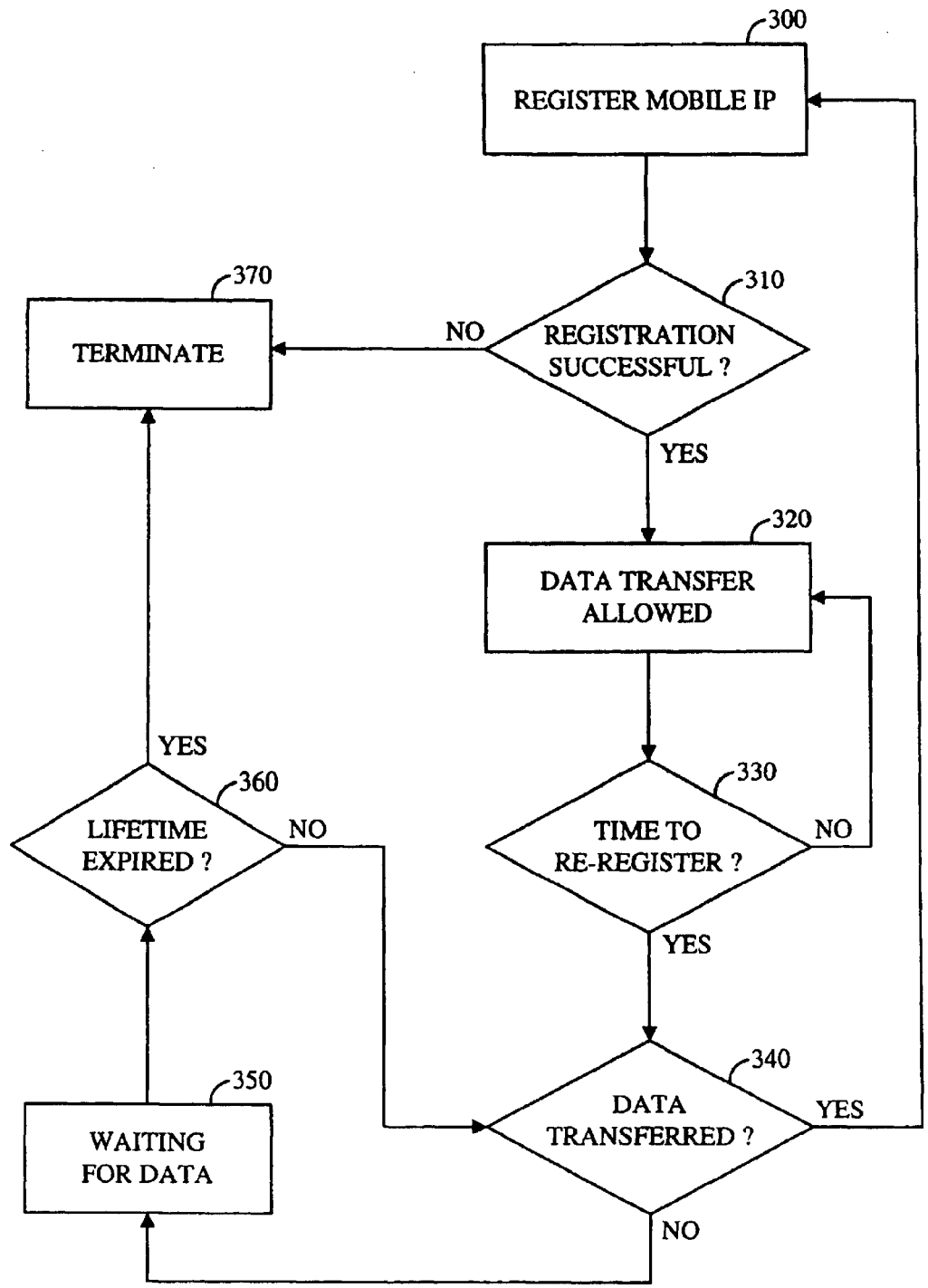
FIG. 3 is a flowchart of a new re-registration process.

FIG. 3 is a flowchart of a method for re-registering a mobile node operating within the auspices of a foreign agent. A processor and memory element are configured to perform the method steps described as follows. At step 300, the mobile node performs an initial registration with the foreign agent, whereupon the foreign agent communicates with the home agent of the mobile node to approve the servicing of the mobile node. At step 310, a determination is made as to whether the registration is successful. If the registration is unsuccessful, then the session terminates at step 370. If the registration is successful, then at step 320, data packet transfers are allowed between the mobile node and the foreign agent. At step 330, the timer for re-registration is examined. If it is not time to re-register, then data packet transfers are allowed.

If it is time to re-register, then at step 340, the mobile node must consider whether any data packets have been exchanged with the network. If data packets have been transferred, then the registration at step 300 is repeated for a re-registration. If data packets have not been transferred, then the mobile node waits for any data packets that may be transmitted or received at step 350. As the mobile node waits, a determination as to whether a lifetime timer has expired is performed at step 360. If the lifetime timer has not expired, then the program flow proceeds back to step 340. If the lifetime timer has expired, then the program flow proceeds to step 370, wherein the session is terminated.

If the initial registration is successful and a data transfer occurs before a first time marker $t_1$, then the program flow proceeds as directed by RFC 2002. The first time marker $t_1$ is dependent upon the lifetime $T_1$ set during the initial registration.

If the initial registration is successful and a data transfer does not occur before the first time marker $t_1$, then the mobile node refrains from transmitting a re-registration request to the foreign agent. Instead, the mobile node waits. It should be noted that this step is not suggested by the teachings of RFC 2002. Although a re-registration request is not transmitted, the mobile bindings established during the initial registration are still valid for the duration of the lifetime set at the initial registration. Hence, the foreign agent and the home agent will both continue to route IP packets to the mobile node.

If an IP packet is transmitted or received by the mobile node after the first time marker $t_1$, but before the end of the lifetime set by the initial registration, then the mobile node transmits both the IP packet and a re-registration request. Once a re-registration request is accepted, a new lifetime period is set, and the program flow repeats until the mobile node is no longer within the operating range of the foreign agent. If, however, the mobile does not send any data until the lifetime expires, the session will expire and be terminated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable Rom (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for registering a mobile node operating in a visited network, comprising:
   a memory element; and
   a processor configured to execute a set of instructions stored within the memory element, the set of instructions for:
   performing an initial registration with a foreign agent in the visited network;
   if an IP packet is transferred within a predetermined time period, then following a standard protocol;
   if an IP packet is not transferred within the predetermined time period, then refraining from performing a re-registration with the foreign agent, wherein refraining from performing the re-registration is contrary to the standard protocol; and
   if an IP packet is transferred after the predetermined time period expires and before a registration lifetime expires, then transmitting a re-registration request.

2. An apparatus for re-registering a mobile node with a foreign agent, comprising:
   a memory element; and
   a processor configured to execute a set of instructions stored within the memory element, the set of instructions for:
   performing a registration with the foreign agent wherein a registration lifetime is set;
   refraining from performing a re-registration if a predetermined period, which is less than the registration lifetime, has expired and no packet has been transmitted or received at the mobile node; and
   performing a re-registration only if a packet is transmitted or received after a successful registration and before the expiration of the registration lifetime.

3. An apparatus for registering a mobile node operating in a visited network, comprising:
   registration means for performing an initial registration and subsequent re-registrations of the mobile node with a foreign agent in the visited network;
   a first timing means set to a first time variable for use with the registration means, wherein the registration means uses the timing means to determine whether to follow a standard protocol or to disregard the standard protocol, wherein disregarding the standard protocol is to refrain from performing the re-registration of the mobile node; and
   a second timing means set to a second time variable, wherein the second timing means expires when an IP session is over and wherein the first time variable is smaller than the second time variable when the IP session is maintained.

4. A method for re-registering a mobile node with a foreign agent, comprising:
   performing an initial registration with a foreign agent in the visited network;
   if an IP packet is transferred between the mobile node and the foreign agent within a predetermined time period, then following a standard protocol;
   if an IP packet is not transferred within the predetermined time period, then refraining from performing a re-registration with the foreign agent, wherein refraining from performing the re-registration is contrary to the standard protocol; and if an IP packet is transferred after the predetermined time period and before the expiration of a registration lifetime, then transmitting a re-registration request.

5. A method for minimizing the impact of registration requests from a travelling mobile node, comprising:

performing initial registration with the foreign agent wherein a lifetime is set;

refraining from performing a re-registration if a pre-determined period, which is less than the registration lifetime, has expired and no packet has been transmitted or received; and performing a re-registration only if a packet is transmitted or received after the expiration of the pre-determined period and before the expiration of the registration lifetime.

* * * * *